(No Model.)
H. E. STURCKE.
PROCESS OF AND APPARATUS FOR MAKING SULFATE OF LIME.
No. 601,179. Patented Mar. 22, 1898.
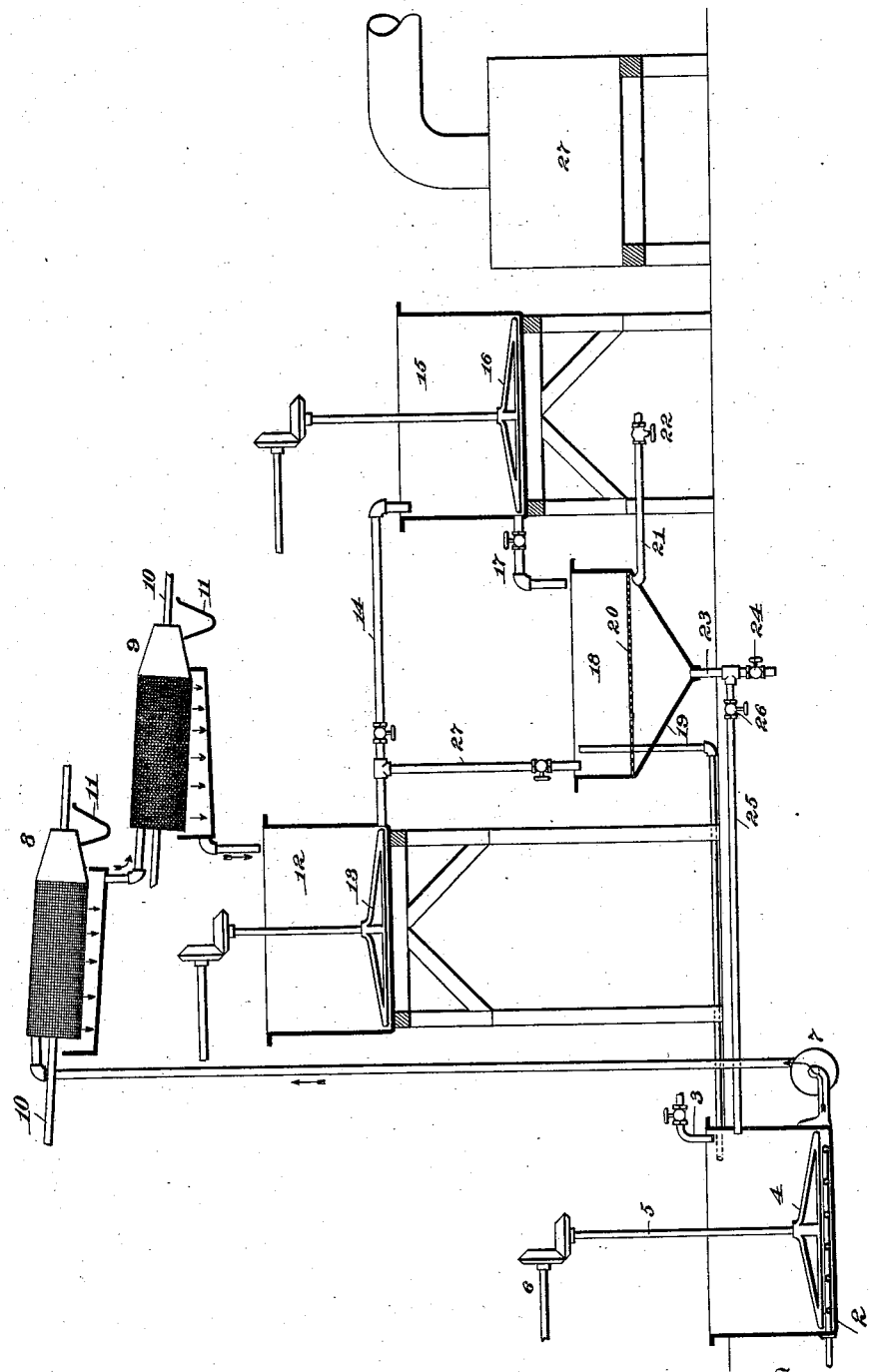

UNITED STATES PATENT OFFICE.

HERMAN E. STURCKE, OF JAMAICA, NEW YORK, ASSIGNOR TO THE AETNA CHEMICAL COMPANY, OF NEW YORK, N. Y.

PROCESS OF AND APPARATUS FOR MAKING SULFATE OF LIME.

SPECIFICATION forming part of Letters Patent No. 601,179, dated March 22, 1898.

Application filed November 4, 1897. Serial No. 657,346. (No model.)

*To all whom it may concern:*

Be it known that I, HERMAN E. STURCKE, a citizen of the United States, residing at Jamaica, in the county of Queens and State of New York, have invented a certain new and useful Improvement in Processes of and Apparatus for Preparing Sulfate of Lime from the Lime Residues Obtained in the Manufacture of Caustic Soda, of which the following is a specification.

In the manufacture of caustic soda or caustic potash by treating soda-ash or potash solutions with caustic lime a residue is obtained which at the present time is not only worthless, but is a source of much annoyance to the manufacturers of caustic soda and caustic potash, as it accumulates in large quantities and is disposed of only with difficulty. This residue I find is substantially the same whether obtained in the manufacture of caustic soda or caustic potash, and consists principally of carbonate of lime, caustic or hydrated lime, and impurities.

It is the prime object of my invention to provide a process by means of which this residue may be treated and a valuable article of commerce—namely, substantially pure sulfate of lime—produced. Such a product is capable of use as a paper-filler and for other purposes to which sulfate of lime is now applied.

A further object of the invention is to provide an apparatus for carrying out the process of treating the caustic-soda residues for obtaining sulfate of lime, as stated.

In an application for Letters Patent of the United States, filed on even date herewith and numbered serially 657,345, I describe and claim a process for separating the carbonate of lime obtained in the caustic-soda residues from all insoluble impurities contained in such residues—such as coal, sand, dirt, &c.— by mechanical means, such as by screening, floating, or jigging. The carbonate of lime thus separated generally contains varying quantities of caustic lime, which may, if desired, be converted into carbonate of lime, either before or after the mechanical separation, by treatment with carbonic acid or be dissolved out by excess of water or by the addition of a sufficient quantity of a liquid acid, such as hydrochloric acid, sulfurous acid, or sulfuric acid. It is, however, not necessary in the carrying out my present invention to separate such caustic lime from the carbonate by the means indicated, because I find that when the carbonate is treated for the production of sulfate the caustic is also converted into sulfate.

In carrying out my improved process I proceed substantially as follows: The lime residue obtained from the manufacture of caustic soda when such residue is in the form of more or less dried cakes or in a more or less consistent paste or mush is mixed with a large excess of water and stirred up therewith until a relatively thin milk of carbonate of lime results. The thin milk of carbonate of lime, whether or not the same has been treated for the dissolution or transformation of caustic lime, as explained, is now subjected to a mechanical treatment to effect the separation of the carbonate from practically all other insoluble solid impurities.

The mechanical treatment of the milk of carbonate of lime may be effected by screening and sifting or by floating, or by the combination of both, or by jigging, or by any other of the mechanical manipulations by which substances of different degrees of fineness or of different specific gravities are separated one from the other. Preferably, however, I effect this separation by screening, since I find that the carbonate of lime obtained from the residue resulting from the manufacture of caustic soda when intimately mixed with water is in the form of extremely-fine particles, which are much finer than the greatest portion of the solid impurities usually accompanying the carbonate of lime in the residue. This carbonate of lime can readily be passed through a wire screen or gauze of one hundred, one hundred and fifty, and even two hundred meshes to the linear inch. It is therefore only necessary to pass the thin milk of carbonate of lime through a very fine screen in order to retain and separate the largest portion of the solid impurities.

In practice it has been found that it is advantageous to pass the thin milk of carbonate of lime through two or more screens of successively-increasing fineness of mesh, the first screen being relatively coarse—for instance, forty meshes to the linear inch—the next screen somewhat finer—for instance, one hundred meshes to the linear inch—and the last screen being very fine—for instance, one hundred and fifty or two hundred meshes to the linear inch. When a plurality of screens are used, I find that the first screens will retain the bulk of the coarser particles, thereby avoiding the clogging up of the last or finest screen. When the carbonate of lime is passed through screens of the proper mesh, I find that ninety-five per cent. and more of the impurities are separated from the carbonate. The thin milk of carbonate of lime after passing the screens may be run into a reservoir, if necessary, and then be passed into settling-tanks or onto a vacuum-filter or through a filter-press, by means of which the solid carbonate of lime will be separated from the bulk of the water and the impurities dissolved therein. It may then be washed with water to remove the last traces of soluble impurities in the carbonate and, if desired, be dried either artificially or by exposure to the air. I prefer, however, in the carrying out of my present invention to subject the carbonate not in the form of a dry powder or friable lumps, as they are produced by the process described in my said application, but in the form of the thin milk of carbonate after the same has passed the mechanical separators—such, for instance, as the screens referred to. In this form the milk is treated with a dilute solution of sulfuric acid, which converts the carbonate of lime into pure sulfate of lime, which latter is filtered off and subsequently dried.

In the manufacture of sulfate of lime, as stated, there is no necessity of removing any caustic which is present, since the addition of the sulfuric-acid solution converts both the carbonate and the caustic of lime into sulfate. This addition of sulfuric acid is preferably effected in a tank, into which the milk of carbonate of lime is passed after leaving the screens or other mechanical separators. The sulfate of lime is preferably separated from the liquid in a vacuum-filter or in a filter-press, and the resulting cakes are either suitably dried or are sold in the moist or paste form. This sulfate of lime is well adapted for use as a paper-filler or for other purposes to which lime-sulfate is now applied.

In carrying out the process above outlined any suitable apparatus may be employed, that shown in the accompanying drawing being a convenient form of apparatus for the purpose.

1 represents the mixer or receiving-tank, into which the residues are placed and to which water is added for converting said residues into a thin milk, as stated. If it is desired to subject the residue in this mixer to chemical treatment for dissolving out the caustic lime or for converting said caustic lime into carbonate of lime, the necessary appliances are to be employed. For instance, a perforated injection-coil 2 may be used, as shown, for injecting carbonic acid into the mixer, so as to convert said caustic lime into carbonate of lime. As stated, however, this treatment is not necessary, since the caustic will be converted into carbonate by the action of sulfuric acid. The water may be admitted through a suitable pipe 3. The mixer 1 is provided with suitable stirring-arms 4 4, operated from the vertical shaft 5, by which the material will be thoroughly agitated and the necessary thin milk produced. Power to the shaft 5 may be communicated from a line-shaft 6 or in any other suitable way. From the mixing-tank the thin milk of carbonate of lime is pumped by a pump 7 (preferably a rotary pump) to the mechanical separating apparatus, which in the drawing comprises two revolving screens 8 and 9. The first-mentioned screen may be of a relatively coarse mesh—for instance, eighty meshes to the linear inch—but the screen 9 should be of a very fine mesh—say one hundred and fifty or two hundred meshes to the linear inch—so as to allow only for the passage through the same of the minute particles of carbonate. These screens are operated from suitable shafts 10 10, as is common, and the tailings pass off through suitable chutes 11 11. These chutes may be separated or be connected to a common duct or pipe, as will be understood. The filtrate passing from the screen 9, and which consists almost entirely of carbonate of lime and water, is preferably passed to a suitable reservoir 12, having stirring-arms 13 therein. Said reservoir is large enough to enable a considerable supply of the thin milk of carbonate of lime to be maintained on hand. From the reservoir 12 the milk of carbonate of lime passes by a pipe 14 to a mixing-tank 15, having stirring-arms 16 therein. This mixing-tank 15 contains a sufficient amount of dilute sulfuric acid by which the carbonate will be immediately converted into a practically pure sulfate of lime. This sulfate of lime, in the form of a precipitate, is drawn off with the water from the tank 15 through a draw-off pipe 17 and is passed into a suitable vacuum-filter 18 or other equivalent apparatus by which the water will be drawn off from the sulfate. The vacuum-filter 18 is of any suitable type and comprises a receptacle 19, having a screen 20 therein, and with a pipe 21, which connects with a vacuum pump or tank having a vacuum-supply. A valve 22 cuts off the vacuum-supply.

23 is a pipe leading from the receptacle 19 into the sewer or elsewhere, provided with a valve 24 therein, and 25 is a pipe connecting the pipe 23 with the mixing-tank, the latter pipe having a valve 26 therein, whereby water from the vacuum-filter may be conducted back to the mixing-tank 1 when economy is desired.

With the apparatus shown there is a pipe 27, leading from the pipe 14 into the vacuum-filter, the purpose of which is to conduct the thin milk of carbonate into said vacuum-filter when it is not desired to form the sulfate, as explained, whereby the apparatus illustrated will be capable of use for carrying out the process of producing a dry carbonate of lime, as described in my said companion case. After the said sulfate of lime has been dried in the filter 18 it may be desiccated by exposure to the air or by being introduced into a drier 27', artificially heated and of any suitable type.

Having now described my invention, what I claim as new, and desire to secure by Letters Patent, is as follows:

1. The process of treating residues obtained from the manufacture of caustic soda or caustic potash, comprising essentially carbonate of lime with insoluble impurities, which consists in adding water to the residues so as to form a thin milk, in passing said milk through mechanical separators so as to separate the carbonate of lime from the insoluble impurities, and in subjecting the milk of carbonate to the action of sulfuric acid so as to convert the carbonate into sulfate of lime, substantially as set forth.

2. The process of treating residues obtained from the manufacture of caustic soda or caustic potash, comprising essentially carbonate of lime with insoluble impurities, which consists in adding water to the residues so as to form a thin milk, in passing said milk through mechanical separators so as to separate the carbonate of lime from the insoluble impurities, in subjecting the milk of carbonate to the action of sulfuric acid so as to convert the carbonate into sulfate of lime, and in separating said sulfate of lime from the water, substantially as set forth.

3. The process of treating residues obtained from the manufacture of caustic soda or caustic potash, comprising essentially carbonate of lime with insoluble impurities, which consists in adding water to the residues so as to form a thin milk, in passing said milk through mechanical separators so as to separate the carbonate of lime from the insoluble impurities, in subjecting the milk of carbonate to the action of sulfuric acid so as to convert the carbonate into sulfate of lime, in separating said sulfate of lime from the water, and in finally drying said sulfate, substantially as set forth.

4. Apparatus for treating residues obtained from the manufacture of caustic soda or caustic potash, comprising a mixing-tank in which the residues are subjected to the action of water, mechanical separating devices for separating the carbonate of lime from the insoluble impurities, a second mixing-tank in which the milk of carbonate is subjected to the action of sulfuric acid, a vacuum-filter for drying the sulfate of lime produced in said second tank and suitable conduits connecting the same, substantially as set forth.

5. An apparatus for treating residues obtained from the manufacture of caustic soda or caustic potash, comprising a mixing-tank in which the residues are mixed with water, a plurality of screens of progressively finer mesh to which the material is passed and by which the carbonate of lime will be separated from the insoluble impurities, a second mixing-tank in which the milk of carbonate will be subjected to sulfuric acid, a vacuum-filter and suitable conduits connecting the same, substantially as set forth.

6. A connected apparatus for treating residues obtained from the manufacture of caustic soda or caustic potash, comprising a mixing-tank in which the residues are mixed with water, mechanical separating devices for separating the carbonate of lime from the insoluble impurities, an intermediate receiving-reservoir connected with said mechanical separating devices, a mixing-tank connected with said receiving-reservoir and in which the milk of carbonate is subjected to the action of sulfuric acid, and a vacuum-filter connected with said second mixing-tank, substantially as set forth.

This specification signed and witnessed this 27th day of October, 1897.

HERMAN E. STURCKE.

Witnesses:
 FRANK L. DYER,
 EUGENE CONRAN.